Patented Oct. 9, 1928.

1,686,873

UNITED STATES PATENT OFFICE.

CLAUDE G. MINER, OF BERKELEY, CALIFORNIA, ASSIGNOR TO PHOSPHORUS HYDROGEN COMPANY, OF NEW YORK, N. Y., A CORPORATION OF MAINE.

PROCESS OF MAKING OXY-COMPOUNDS OF PHOSPHORUS.

No Drawing. Application filed October 27, 1923. Serial No. 671,242.

This invention relates to a method of treating phosphorus bearing ores to obtain phosphorus, and then causing the phosphorus to react under certain conditions with water or steam to give an acid of phosphorus and hydrogen, the latter, if so desired, being caused to unite with nitrogen by any standard process to give ammonia. The acid of phosphorus and ammonia can then be brought together under standard and proper conditions to obtain an ammonium phosphate.

The invention further relates to novel processes of preparing oxy-compounds of phosphorus and hydrogen and other products as will be more fully set forth hereinafter.

If an alkali metal, preferably potassium, is present, the reaction between phosphorus and water (the latter when desired in the form of steam) will take place more readily and with less consumption of energy. In this case, however, a potassium phosphate is eventually obtained, which with ammonia will give an ammonium potassium phosphate. Therefore this invention likewise relates to a method of treating a phosphorus bearing ore or rock mixed with a potash bearing rock, ore, or compound, and a carbonaceous material, all in suitable proportion, to obtain a condensate consisting of phosphorus and potassium, and then causing or allowing said condensate to react with water or steam at the proper temperature to produce a potassium phosphate and hydrogen, and then, when desired, utilizing said hydrogen for the fixation of nitrogen by any standard process to produce ammonia which with the potassium phosphate will give an ammonium potassium phosphate.

This invention, therefore, affords a method for producing a fertilizer containing the three essential plant food components, namely,—potash, ammonia, and phosphoric acid. This complete fertilizer compound is an ammonium potassium phosphate, which is suitable in many respects, in that the ratio of the three plant foods can be regulated to suit almost any demand. Another desirable feature is that a compound containing these three essential plant foods can be obtained, that has almost any desired solubility or stability.

In the production of this ammonium potassium phosphate, a phosphorus bearing ore is mixed with a potash bearing ore or compound in suitable proportion, and this mixture mixed with a carbonaceous material in proper proportion. The said total mixture is then subjected to the proper temperature in a suitable furnace to cause a reaction to take place whereby the potassium and phosphorus are volatilized along with the carbon oxide gases, condensing in the form of an alkali-phosphorus compound, or alkali metal phosphide.

The phosphorus and potassium are condensed, preferably rapidly, so as to prevent the formation of the explosive compound $K_6 C_6 O_6$, although this compound does not form as readily in the presence of phosphorus. Due to difficulty in precipitating phosphorus fumes, a Cottrell precipitator will assist the collection of the condensate. The alkali metal phosphide (condensate of potassium and phosphorus) is then caused or allowed to react with water or steam at the proper temperature by any suitable means whereby a potassium phosphate and hydrogen will form. The hydrogen is then utilized to fix nitrogen by any standard process. The resultant ammonia can be brought in contact with the potassium phosphate under standard conditions to obtain an ammonium potassium phosphate. It is preferred to mix the phosphate rock and potash rock in such a manner that the phosphorus and potassium are in about equimolecular proportion, in which case it is advisable to mix in some lime in order to obtain the proper silicate slag, though I do not limit myself to this proportion.

The potassium plays an important function in the reaction in addition to becoming an important part of the product. In the presence of an alkali metal, in this special case potassium, phosphorus will react with water or steam more readily and completely than alone. In fact with a suitable amount of potassium present, the condensate of potassium and phosphorus will react with water energetically at the ordinary temperature to form a potassium phosphate and hydrogen.

For simplicity this condensate containing phosphorus and potassium will be referred to herein as potassium phosphide, although it is to be understood that this term is not intended to imply that a definite chemical compound exists, or to designate a definite ratio between the components, although it is preferred to have the phosphorus-potassium ratio lie between equimolecular proportions, and two grammolecules of phosphorus to one of the potassium.

The hydrogen as liberated is in the nascent form, and it is known that hydrogen under proper conditions of temperature, pressure and catalyst when required combines with nitrogen to form ammonia until the equilibrium conditions of the reaction are reached. Hence it is preferred in practice to have the potassium phosphide condensate react with water in the presence of nitrogen. In as much as the total reaction liberates a large amount of heat and a resultant rise of temperature to such a degree that would alter the most suitable conditions for the formation of the largest per cent of ammonia, it is preferred in practice to add the condensate to water in the presence of nitrogen so as to keep the temperature as near normal as possible. As pressure assists the reaction, it is preferred to have the reaction take place under pressure. The ammonia as formed unites with the acid potassium phosphate to form an ammonium potassium phosphate. The uncombined hydrogen and nitrogen can be altered to the correct ratio and combined by any standard process, as for illustration by the Haber or Claude process.

By varying the ratio of the potash bearing rock to the phosphate rock, different ammonium potassium phosphates can be obtained to suit the different fertilizer demands.

It is naturally possible for one skilled in the art to vary the details of the above procedure as well as the proportions of the ingredients, pressure, temperature, etc. without departing from the spirit of the invention. Therefore I do not wish to be limited to the above disclosure except as may be required by the claims.

Having thus described my invention, what I claim and desire to secure by Letters Patent is:—

1. Process of producing an oxy-compound of phosphorus, comprising reacting with water upon phosphorus in presence of an alkali metal which is intermixed with the phosphorus in the form of a condensate.

2. Process of producing an oxy-compound of phosphorus, comprising reacting with water upon phosphorus in presence of an alkali metal.

3. Process comprising reacting with water upon phosphorus in presence of potassium.

4. Process of preparing an ammonium phosphate compound, comprising reacting with water on phosphorus in presence of an alkali metal, producing thereby an oxy-compound of phosphorus, and hydrogen; combining the hydrogen with nitrogen to form ammonia; and effecting a reaction between the ammonia and the oxy-compound of phosphorus.

5. Process of producing a soluble phosphate and hydrogen, comprising smelting a charge containing a phosphate rock, a potassium bearing material, and a carbonaceous reducing agent under conditions to yield a condensate containing phosphorus and potassium; and reacting on said compound with water to prepare a phosphate of potassium, and hydrogen.

Signed at Seattle in the county of King and State of Washington this 14th day of July, 1923.

CLAUDE G. MINER.